United States Patent [19]

Takahashi et al.

[11] 3,798,562

[45] Mar. 19, 1974

[54] EXPANDING CIRCUIT IN A COMPRESSION AND EXPANSION SYSTEM

[75] Inventors: Nobuaki Takahashi, Yamato; Masao Kasuga, Sagamihara; Nobuhide Ohsaki, Yokohama; Yashuhisa Okabe, Zama; Hiromo Sekiguchi, Yokohama, all of Japan

[73] Assignee: Victor Company of Japan, Ltd., Yokohama, Japan

[22] Filed: Oct. 2, 1972

[21] Appl. No.: 294,356

[30] Foreign Application Priority Data

Oct. 5, 1971 Japan .............................. 46-77532

Apr. 18, 1972 Japan .............................. 47-38941

[52] U.S. Cl. ....................... 330/28, 330/29, 330/86, 333/14

[51] Int. Cl. .............................................. H03g 3/30

[58] Field of Search ........... 330/29, 28, 35, 86, 132; 333/14; 179/100.2 K

[56] References Cited

UNITED STATES PATENTS

| | | | |
|---|---|---|---|
| 2,358,045 | 9/1944 | Barney | 333/18 X |
| 3,631,365 | 12/1971 | Dolby | 333/14 |
| 3,452,290 | 6/1969 | Huntley | 330/29 X |

*Primary Examiner*—Herman Karl Saalbach

*Assistant Examiner*—James B. Mullins

[57] ABSTRACT

An expanding circuit is provided for a compression and expansion system. It operates to expand signals compressed in the compression system responsive to a control system of two loops, with respect to the medium-frequency component and the high-frequency component of the signals transmitted to the expanding circuit. The expanding circuit has a control system of only a single loop for varying the gain an input signal by means of control signals obtained in accordance with the levels of the medium-frequency band and the high-frequency band. An attenuation circuit imparts to signals of gains thus varied, characteristics whereby the level of the high-frequency band is attenuated more than that of the medium-frequency band.

10 Claims, 16 Drawing Figures

EXPANDING CIRCUIT IN A COMPRESSION AND EXPANSION SYSTEM

BACKGROUND OF THE INVENTION

This invention relates to an expanding circuit for use in a compression and expansion system and more particularly to an expanding circuit capable of carrying out expansion, within a single loop in the expansion system, of a signal which has been previously compressed with two loops. The expansion provides different characteristics in accordance with the frequency band in the compression system of a compression and expansion system.

The present inventors have previously proposed a compression system wherein the frequency band of a signal is divided into a plurality of, for example, two bands, compression is accomplished by varying the frequency response of each band in accordance with the level of the input signal. The resulting signal thus compressed and transmitted is expanded in an expansion system. The proposal was made through U.S. Pat. application Ser. No. 241,026, filed Apr. 4, 1972, entitled "COMPRESSION AND/OR EXPANSION SYSTEM AND CIRCUIT."

In this previously proposed compression and expansion system, compressors are provided with two loops in the compression system. The expandors are also provided with two loops also in the expansion system.

Then, the expanding circuit is provided in a record disc reproduction or playback apparatus which the general user purchases. For example, this compression and expansion system is applied to a 4-channel record disc, or so-called CD-4 record disc, which the applicant has also previously proposed, and which has been reduced to practice. For this reason, there has been a problem in that, if the expanding circuit has two loops, the expanding circuit and the record disc reproducing apparatus will be that much more expensive.

SUMMARY OF THE INVENTION

Accordingly, it is a general object of the present invention to provide a new and effective expanding for use in a compression and expansion system wherein the above described problem is solved.

More specifically, an object of the invention is to provide an expanding circuit capable of expanding with a control system of a single loop. Here, an object is to provide an expansion system for a signal which has been compressed with a compressing circuit having a control system of two loops in a compression system. Since the expandor control system comprises only one loop, the circuit organization of the expanding circuit is simple and inexpensive.

Still another object of the invention is to provide an expanding circuit capable of carrying out expansion, with almost no difference in audibility with respect to two loops expansion with a single loop control system.

A further object of the invention is to provide an expansion circuit which obtains a control signal from a low-impedance emitter circuit and is capable of carrying out expansion without producing distortion, even with respect to saturation of the control signal generating circuit.

Other objects and further features of the present invention will be apparent from the following detailed description with respect to preferred embodiments of the invention when read in conjunction with the accompanying drawings.

DETAILED DESCRIPTION

In the aforementioned example of an application of the compandor system which the applicant has previously proposed to four-channel records, a medium frequency band signal in a frequency band of 200 Hz – 2,000 Hz and a high frequency band signal in excess of the 2,000 Hz band are, respectively, compressed 10 dB and 15 dB in the compression system.

Therefore, there arises the need for expanding by 10 dB and 15 dB respectively a medium frequency band signal in a frequency band 200 Hz – 2,000 Hz and a high frequency band signal in a frequency band in excess of 2,000 Hz, in a system for reproducing sounds from a record disc on which the compressed signals have been recorded.

Figure 1:
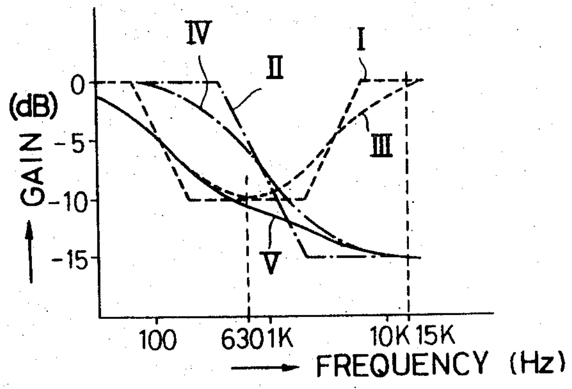
FIG. 1 is a graphical representation indicating the frequency-gain characteristics of an expanding circuit in a four-channel record disc reproducing apparatus.

FIG. 1 indicates a typical frequency-gain response of an expanding circuit for use in such a four-channel record disc and reproducing apparatus. In this FIG. 1, curves I and II represent asymptotes for determining the medium and high-band frequency characteristics, respectively. Curves III and IV are the actually plotted frequency characteristic curves for these bands. The overall frequency characteristic curve, a composite of curves III and IV, is designated by V.

Figure 2:
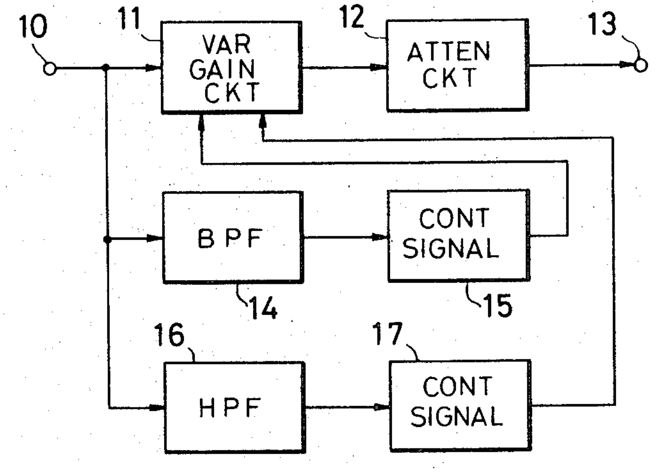
FIG. 2 is a block diagram of an expanding circuit in a compression and expansion system which the applicants have previously proposed.

The frequency characteristics shown in FIG. 1 have been realized by an expanding circuit as shown by schematic block diagram in FIG. 2 which is incorporated in the proposed expanding system.

Referring to FIG. 2, a signal compressed by two-loop compressors in the compression system is transmitted through an input terminal 10 to a variable gain circuit 11, a band-pass filter 14, and a high-pass filter 16. The medium frequency band signal 200 Hz – 2,000 Hz of the input signal passes through the band-pass filter 14 and is fed to a control signal generator 15. The high frequency band signal in excess of 2,000 Hz passes through the high-pass filter 16 and is fed to a control-signal generator 17. Control signals from the control-signal generators 15 and 17 are fed, respectively, to the variable gain circuit 11 to control a control element contained in the circuit 11.

Figures 4, 5:
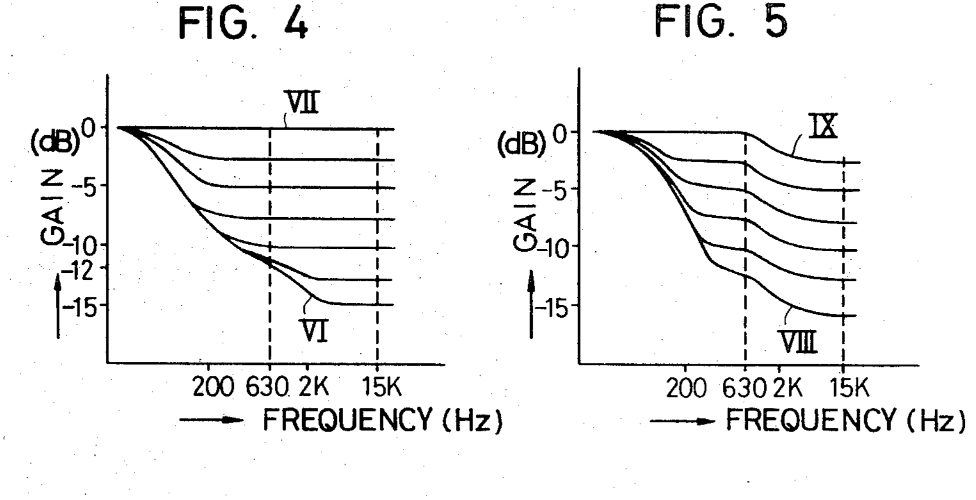
FIG. 4 is a graphical representation indicating the frequency-gain characteristic of the previously proposed expanding circuit shown in FIG. 2.
FIG. 5 is a graphical representation indicating the frequency-gain characteristic of the expanding circuit according to the invention shown in FIG. 3.

Thus, the medium and high band frequency characteristics of a signal delivered through the terminal 10 is variably controlled and expanded in the variable gain circuit 11 by each control signal. Then, the signal is derived from an output terminal 13, as an output signal, via an attenuating circuit 12. The frequency-gain response of the output signal is as shown in FIG. 4. The frequency response varies as a parameter of the input signal level and manifests a characteristic curve such as VI which attenuates about 12 dB and 15 dB, respectively, in the medium frequency band (say 630 Hz) and the high frequency band (say 15 KHz) for extremely low input signal levels. With an increase in the input signal level, the response approaches a flat curve VII.

In the expanding circuit according to the proposed system, there are provided two control loops. One of the two loops contains the band-pass filter 14, the control signal generator 15, the other loop contains the high-pass filter 16 and the control signal generator 17. For these reasons, there have arisen difficulties as mentioned previously such as complexity of the expanding circuit structure and high manufacturing cost.

Figure 3:
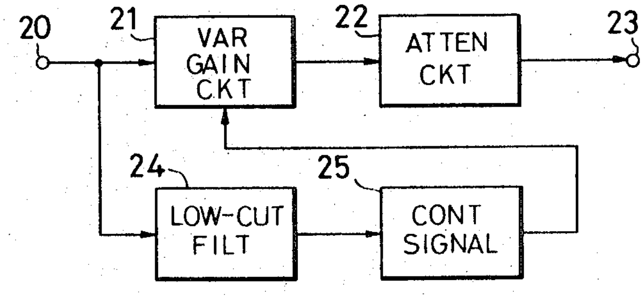
FIG. 3 is a block diagram of one embodiment of an expanding circuit according to the present invention.

Accordingly, it is the object of this invention to solve these difficulties. FIG. 3, is a schematic block diagram showing an embodiment of the expanding circuit to explain the principles of this invention.

In the reproducing system, reproduction is performed from a four-channel record disc on which a signal compressed by use of the two-loop compressors has been recorded in the recording system. The reproduced signal is applied to an input terminal 20. The reproduced signal delivered from the input terminal 20 is supplied to a variable gain circuit 21 and a low-cutoff filter 24. The medium frequency band (200 Hz – 2,000 Hz) and high frequency band (over 2,000 Hz) signals derived from the low-cutoff filter 24 are fed to a control signal generator 25. A control signal derived from the control signal generator 25 is fed to the variable gain circuit 21 to control the control element in the circuit 21.

The reproduced signal whose medium and high band frequency characteristics have been controlled and expanded by the variable gain circuit 21 is derived from an output terminal 23 via an attenuator circuit 22 as an output signal.

As will be evident from FIG. 3, there is provided only a single loop to obtain a gain controlling signal in the circuit of this invention.

Considering a frequency spectrum of music, for example, the acoustic energy in the medium-frequency band is less than that in the high-frequency band, for almost all sound sources.

Accordingly, with the two-loop system shown in FIG. 2, the control signal output of the high-frequency band tends to become smaller than that of the medium-frequency band. Whereas with the single-loop system shown in FIG. 3, the high frequency band characteristics of the variable gain circuit tends to be elevated in the presence a medium frequency band input signal, even in the absence of a high frequency band input signal.

Therefore, the overall characteristics of the expanding circuit shown in FIG. 3 become as shown in FIG. 5. Differing from the characteristics shown in FIG. 4, these characteristics need to be attenuated more in the high frequency band than in the medium frequency band. Conversely, provided that the expanding circuit has the frequency-gain characteristics as indicated in FIG. 5, a signal compressed by the use of a two-loop compressor can be favorably expanded by a single-loop expanding circuit. When the input signal level is extremely low in the frequency-gain characteristics indicated in FIG. 5, a characteristic curve VIII which attenuates, for example, approximately 12 dB in the medium frequency band (630 Hz) and approximately 15 dB in the high frequency band (15 KHz) is indicated. With an increase in the input level, there are indicated several curves whose high frequency band attenuates more than 2 dB (for instance, 3 dB) as compared with the medium frequency band. Finally a characteristic curve IX is substantially flat below the medium frequency band. Its high frequency band attenuates approximately 3 dB as compared with the medium frequency band.

Use of such a response, which attenuates in the high frequency band, is effective for modulation noise as will be described hereinunder. When there is music composed only of medium tones, such as a solo played on a flute, the gain in the high frequency band varies in such a single-loop expanding circuit, and both high and medium band noise increase. In this case, the medium frequency band noise is masked by the music and becomes inaudible. However, the high frequency band noise components, being distinguished from the music, become audible. By the use of a frequency response as shown in FIG. 5, however, the high frequency band is attenuated. The high frequency band components become less and inaudible, as modulation noise.

Figure 6:
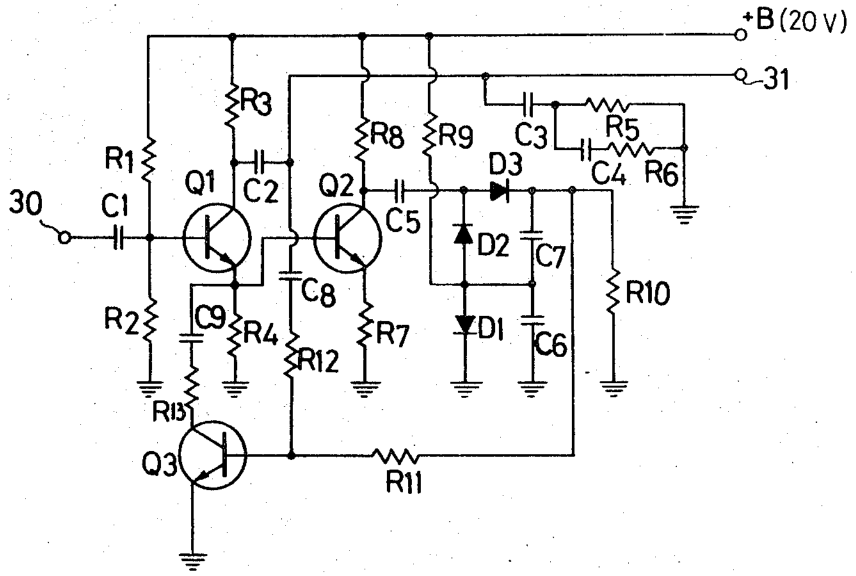
FIG. 6 is a circuit diagram of one embodiment of a specific electrical circuit of the expanding circuit of the invention.

FIG. 6 shows an electrical circuit of the one-loop expanding system invention. It is seen that a transistor Q1 amplifies an input signal applied to its base through an input terminal 30 via a capacitor C1. Reference characters R1 and R2 designate base bias resistors of the transistor Q1, and characters R3 and R4 designate respectively a collector load resistor and an emitter resistor of the transistor Q1. The signal amplified by the transistor Q1 is derived from its collector and delivered to an output terminal 31 via a coupling capacitor C2 as its output.

Capacitors C3 and C4 and resistors R5 and R6 on the output side constitute, in combination, the attenuating circuit 22 of FIG. 3 to fix the attenuation characteristics. The constants of the individual circuit elements in the attenuating circuit are designed to manifest an overall frequency response as shown in FIG. 5, such that the input signal attenuates more in the high frequency band than in the medium frequency band.

A transistor Q2 is employed as an amplifier element in the control signal generator 25 of FIG. 3. It amplifies the level of a signal delivered from the emitter of the transistor Q1 and applied to its base. A control signal is derived from its collector. A capacitor C5, diodes D2 and D3, a capacitor C7, and resistors R10 and R11 constitute, in combination a rectifying circuit for the control signal derived from the collector of the transistor Q2.

A transistor Q3 is employed as a control element in the variable gain circuit 21 of FIG. 3. The impedance of the transistor Q3 is caused to vary responsive to the control signal rectified by the rectifying circuit and applied to its base. As the impedance of the transistor Q3 varies, the impedance of the circuit connected in series therewith, between the emitter of the transistor Q1 and ground together with a capacitor C9 and a resistor R13, is also varied.

The circuit of the above described organization operates in the following manner. When the level of an input signal applied to the input terminal 30 is extremely low, the input signal amplified by the transistor Q1 is so attenuated by the attenuating circuit composed of the capacitors C3 and C4 and the resistors R5 and R6 that the high frequency band is attenuated 3 dB more than the medium frequency band. The attenuated signal is derived from the output terminal 31, as an output signal.

When the input signal level is high, a signal from the emitter of the transistor Q1 is applied to the base of the transistor Q2, an amplified signal is derived from the collector of the transistor Q2. A signal derived from the collector of the transistor Q2 is cut off the low frequency band signal by the capacitor C5, which also operates as a low-cutoff filter, and then the signal is rectified by the diodes D2 and D3 and smoothed by the capacitor C7 and the resistors R10 and R11. The rectified and smoothed positive-voltage signal is applied to the base of the transistor Q3. The resistor R9, diode D1, and capacitor C6 constitute, in combination, a bias circuit for the transistor Q3 so that a prescribed bias can be applied to the base of the transistor Q3, even in the absence of an input signal.

The resistance across the collector and emitter of the transistor Q3 is of a high value when the input signal level is low and is of a low value when the input signal level is high and a large positive voltage signal is applied to its base. Therefore, the amount of current feedback of the transistor Q1 decreases through the capacitor C9 and the resistor R13, when the input signal level is high. The reduction in the amount of current feedback in the transistor Q1 causes a rise in the gain in the high frequency band. In this connection, since the transistor Q1 operates as in emitter-follower, the signal level at the emitter of the transistor Q1 remains substantially unchanged despite of changes in the resistance value of the transistor Q3.

Thus, no control signal voltage can be derived from the emitter of the transistor Q1 when the input signal level is low. A result is that a signal can be derived from the output terminal 13 with a medium frequency band has been attenuated and a high frequency band attenuated even further can be derived from the output terminal 13. Since a control signal voltage is obtained at the emitter of the transistor Q1 when the input signal level is high, the resistance value of the transistor Q2 is caused to vary by the control signal through the transistor Q2 and the rectifying circuit, resulting in a decrease in the current feedback amount. Consequently, a signal whose characteristic is such that the attenuation in both the medium and high frequency bands has been suppressed and substantially flattened, and, further, the high frequency band has been attenuated more than the medium frequency band is obtained at the output terminal 31.

Since the transistor Q2 is operated under a saturated state for high levels, the input impedance in saturation is very low. When a control signal is received from an audio signal circuit having a high impedance, such as the base circuit of the transistor Q1, distortion occurs when the transistor Q2 is saturated. According to the above described embodiment of this invention, however, the control signal is obtained from the emitter circuit of the transistor Q1 having a low impedance, whereby no distortion occurs in the case of saturation. To obtain a signal from the base circuit of the transistor Q1, it is only necessary to use a buffer amplifier. Although it is conceivable to obtain a signal from the collector of the transistor Q1, such a signal is unsuitable generally for a control signal because the medium and high frequency bands have been attenuated by the attenuating circuit.

Further, the capacitor C2 connected to the collector of the transistor Q1, the capacitor C8 connected between the capacitor C2 and the base of the transistor Q3, and the resistor R12 constitute, in combination, a circuit for canceling the distortion caused by the transistor Q3. Assuming that the base voltage of transistor Q3 is constant, the collector-emitter resistance becomes smaller with increasing collector voltage, resulting in low collector-emitter resistance values during a positive half cycle of the input signal and high collector-emitter resistance values during a negative half cycle, thereby causing distortion in the signal waveform.

To solve this problem, the circuit of this embodiment depends upon the fact that when the collector voltage of the transistor Q3 varies in the positive sence, that of the transistor Q1 varies in the negative sense. Thus, changes in the resistance value, with changes in the collector voltage, of the transistor Q3 are canceled by applying a signal on the collector side of the transistor Q1 to the base of the transistor Q3 via the capacitor C8 and resistor R12, thereby reducing the distortion factor of the transistor Q3.

In this embodiment, a silicon transistor is used as the transistor Q3, while the resistor R9 and the silicon diode D1 are used in the bias circuit. For this reason, the voltage across the opposite ends of the diode D1 remains unchanged despite changes in the power source voltage. Further, since the voltage of the diode D1 varies with the forward voltage of the transistor Q3 due to changes in the ambient temperature, the temperature stability is quite favorable.

The constants of the individual circuit elements contained in the circuit of this embodiment are listed below.

| | | | | |
|---|---|---|---|---|
| Resistors | | | | |
| | R1 | 390 KΩ | R8 | 3.9 KΩ |
| | R2 | 33 KΩ | R9 | 100 KΩ |
| | R3 | 15 KΩ | R10 | 100 KΩ |
| | R4 | 2.2 KΩ | R11 | 47 KΩ |
| | R5 | 3.9 KΩ | R12 | 68 KΩ |
| | R6 | 2.2 KΩ | R13 | 330 Ω |
| | R7 | 150 Ω | | |
| Capacitors | | | | |
| | C1 | 10 μF | C6 | 10 μF |
| | C2 | 10 μF | C7 | 1 μF |
| | C3 | 0.22 μF | C8 | 10 μF |
| | C4 | 22 μF | C9 | 1 μF |
| | C5 | 0.1 μF | | |

Figure 7:
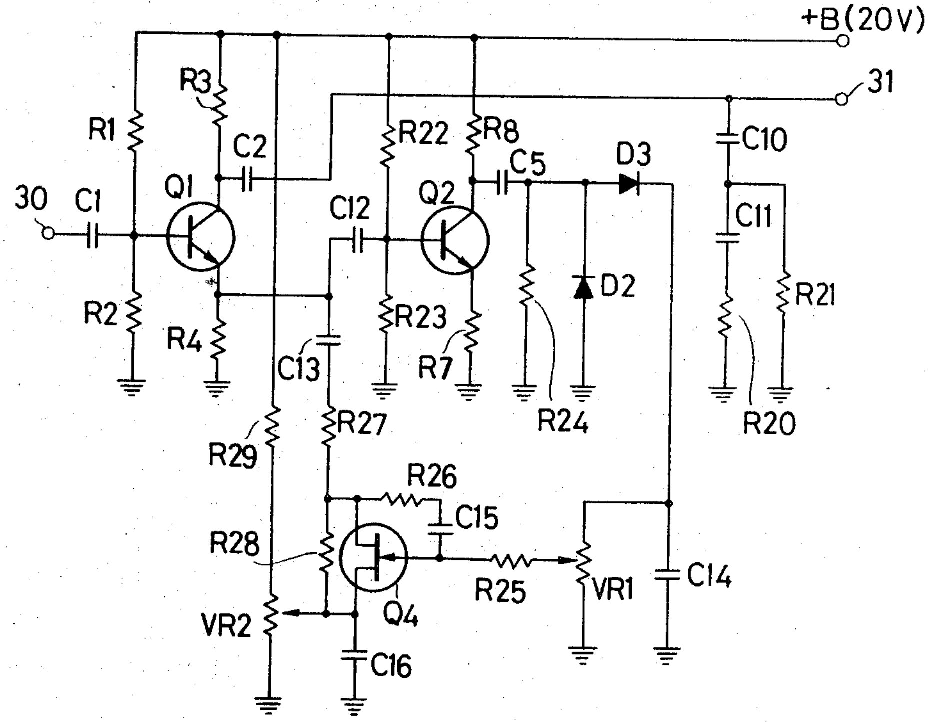
FIG. 7 is a circuit diagram of another embodiment of a specific electrical circuit of the expanding circuit of the invention.

Another embodiment of the expanding circuit, according to this invention, will now be described in conjunction with FIG. 7. In FIG. 7, the same symbols as those in FIG. 6 are employed for the same or equivalent component parts, and the description of such components will not be repeated.

Referring to FIG. 7, a signal applied to the input terminal 30 is amplified by the transistor Q1 and taken out from the output terminal 31 through the capacitor C2. Capacitors C10 and C11, resistors R20 and R21 connected on the output side constitute, in combination, an attenuating circuit. The overall frequency response of this attenuating circuit is so designed, as shown by the graph of FIG. 5, that the input signal attenuates to a prescribed value in the high frequency band. It is desirable that response in the high frequency band fall off by an amount of from 2 to 7 dB more than in the medium frequency band, the amount of the attenuation being set at 7 dB for this embodiment.

The signal level at the emitter of the transistor Q1 is applied through a capacitor C12 to the base of the transistor Q2, which is an amplifying element in the control signal generator 25. The signal is amplified by the transistor Q2, and a control signal is obtained as its output. The reference characters R22 and R23 designate base bias resistors for the transistor Q2. Capacitors C5 and C14, diodes D2 and D3, resistors R24 and R25, FIG. 3, and a variable resistor VR1 constitute, in combination, a rectifying circuit for the control signal generator.

A control signal voltage rectified by the rectifying circuit is applied to the gate of a field-effect transistor (FET) Q4, or a control element in the variable gain circuit, to cause its impedance to vary. A resistor R26 and capacitor C15, connected in series, are further connected across the source and the gate of the FET Q4 to constitute an AC feedback loop, thereby making the impedance variation of FET Q4 linear and reducing distortion. Resistors R28 and R29, a variable resistor VR2, and a capacitor C16 constitute, in combination, a bias circuit for the FET Q4 to provide the source-drain impedance of the FET Q4 in the absence of an input to the gate of the FET Q4 and, at the same time, this bias circuit determines the point at which the impedance begins to vary.

The operation of the circuit is as follows. Assume that the level of an input signal applied to the input terminal 30 is low. After being amplified by the transistor Q1, the input signal, is provided with a frequency response such that the gain in the medium frequency band is attenuated and that the gain in the high frequency band is further attenuated by about 7 dB by the attenuating circuit. The resulting signal is derived from output terminal 31.

When the level of an input signal applied to the input terminal 30 is high, a signal derived from the emitter of the transistor Q1 is applied to the base of the transistor Q2, through the coupling capacitor C12. A control signal for the output of the collector of the transistor Q2 is derived through the capacitor C5 and fed to the above-mentioned rectifying circuit. A combination of the coupling capacitor C12 and the base bias resistors R22 and R23, and a combination of the capacitor C5 and the resistor R24, each operate as a low-cutoff filter for cutting off the low frequency component of the signal. Since these low-cutoff filters are connected in series, they manifest a multiplying action. A steep cutoff of the low frequency component is possible with a slope of the order of 12 dB/oct.

The control signal whose low frequency band has been cut off is rectified by the diodes D2 and D3 and smoothed by a combination of the capacitor C14 and the variable resistor VR1. The positive-voltage signal thus rectified and smoothed is fed to the gate of the FET Q4 through the resistor R25.

The source-drain resistance of the FET Q4 have large values when the input signal level is low they exhibit small values as the input signal level increases and a positive voltage from the rectifying circuit is applied to the gate, thereby reducing the current feedback amount of the transistor Q1 applied through the capacitor C13 and resistor R27. By this reduction of feedback, the gain in the medium and high frequency bands of the output signal increases, the overall frequency response of the output signal becomes one which is close to a flat-topped response and is attenuated in only the high frequency band.

The constants of circuit elements in the FIG. 7 are listed below.

| | | | | |
|---|---|---|---|---|
| Resistors | | | | |
| | R20 | 3.3 KΩ | R25 | 100 KΩ |
| | R21 | 2.7 KΩ | R26 | 100 KΩ |
| | R22 | 470 KΩ | R27 | 330 Ω |
| | R23 | 39 KΩ | R28 | 100 KΩ |
| | R24 | 8.2 KΩ | R29 | 100 KΩ |
| Variable resistors | | | | |
| | VR1 | 50 KΩ | VR2 | 50 KΩ |
| Capacitors | | | | |
| | C10 | 0.22 μF | C14 | 0.22 μF |
| | C11 | 0.018 μF | C15 | 0.022 μF |
| | C12 | 0.047 μF | C16 | 33 μF |
| | C13 | 1 μF | | |

Next to be explained is a comparison of the expansion characteristics of an expanding circuit in which the previously proposed two-loop control system is used and the expansion characteristics of an expanding circuit in which a single loop control system is used. FIGS. 8A, 9A, 10A, and 11A show the two loop expansion characteristics of the former while FIGS. 8B, 9B, 10B, and 11B show the one loop characteristics of the latter.

Figure 8A:
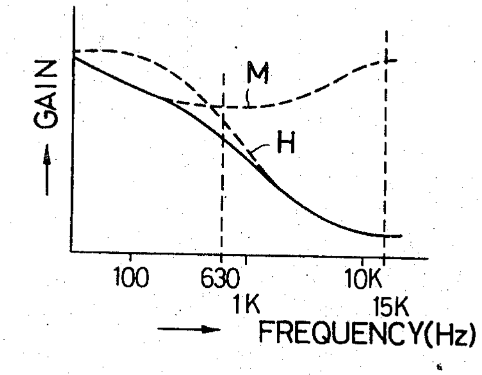
FIGS. 8A through 11B are frequency-gain characteristics indicating respectively the expansion characteristics of the previously proposed two-loop expanding circuit and the single-loop expanding circuit in accordance with the level of the high frequency band component within the input signal.
Figure 8B:
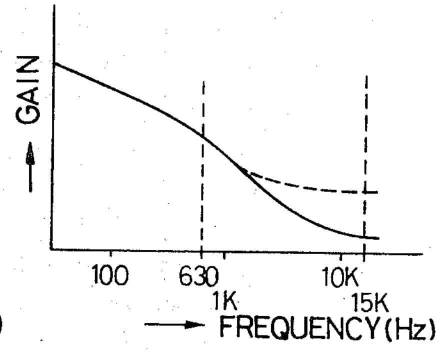

In the previously proposed two-loop expanding circuit, only the medium frequency band control system operates when there is a sound in only the medium frequency band. Thus, as indicated in FIG. 8A, the attenuation amount in the medium frequency band decreases while the frequency in the high frequency band remains unchanged. In FIG. 8A, the dashed lines M and H respectively represent the characteristics in the middle and high frequency bands of the expanding circuit, while the full line represents the overall response. In contrast, in the expanding circuit of this invention, the expandor operates in both the middle and high frequency bands in accordance with a sound in the medium frequency band. However, the circuit according to this invention is designed so that the high frequency band is attenuated more than the medium frequency band. Therefore, its response becomes as shown in FIG. 8B, which is substantially the same as that shown in FIG. 8A. If the high frequency band is designed to provide no attenuation, the amount of attenuation will be reduced in the high frequency band simultaneously with the medium frequency band as indicated by the dashed line in FIG. 8B. Hence, noise in the high frequency band, and particularly the previously mentioned modulation noise, will become audible to the ear.

Figure 9A:
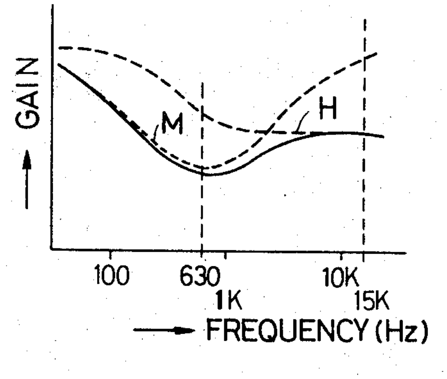
Figure 9B:
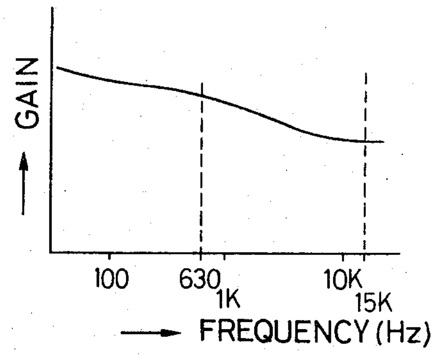

When there is a sound in only the high frequency band, only the high frequency band control system operates in the two-loop expanding circuit, indicated in FIG. 9A, with the result that the attenuation amount in the high frequency band decreases and that in the medium frequency band remains unchanged. In contrast, in the one-loop expanding circuit of this invention, the attenuation amounts in both the medium and high frequency bands decrease in accordance with a sound in the high frequency band as shown in FIG. 9B. It is seen in this case that the gain in the medium frequency band increases as compared with the response shown in FIG. 9A. Accordingly, noise in the medium frequency band, if present, will be increased. Actually, however, noise in the medium frequency band is less audible, and its energy is small. In other words, the difference between the two responses is almost indiscernible.

Figure 10A:
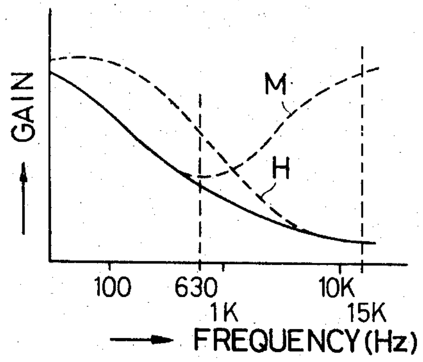
Figure 10B:
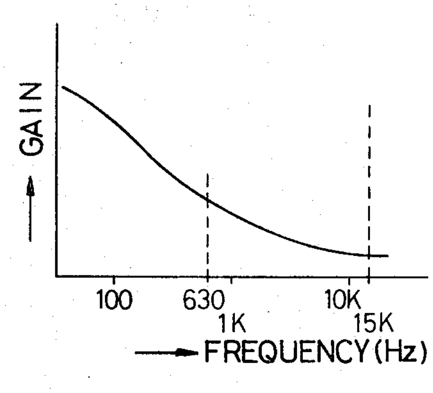

In the case where the sound volume is low in both the medium and high frequency bands, both expanding circuits can barely operate, and their characteristics can be made substantially the same as indicated in FIGS. 10A and 10B by suitably determining the attenuating circuit characteristics.

Figure 11A:
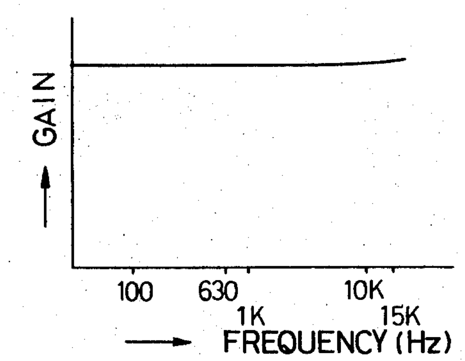
Figure 11B:
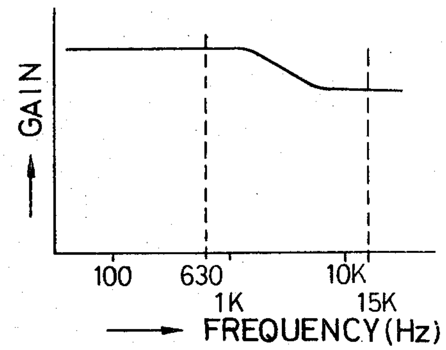

In the case where the sound volume is high in both the medium and high frequency bands, the response of the two-loop expanding circuit becomes flat as shown in FIG. 11A. The response of the one-loop expanding circuit becomes as shown in FIG. 11B, that is, the high frequency band is attenuated more than the medium frequency band. It will be assumed that the output level at which the response of the two-loop expanding circuit becomes flat is 0 VU. Then the mean music level is 5 dB – 10 dB lower, and, at this level, the high frequency band is attenuated by more than several dB (2 dB – 7 dB, for instance) as compared with the medium frequency band in the one-loop expanding circuit, because energy in the former band is higher than that in the latter band.

In the one-loop expanding circuit according to this invention, therefore, the high frequency band is caused to attenuate by more than several dB, as compared with the attenuation of the medium frequency band to meet the response of the two-loop expanding circuit at the mean level.

Figure 12:
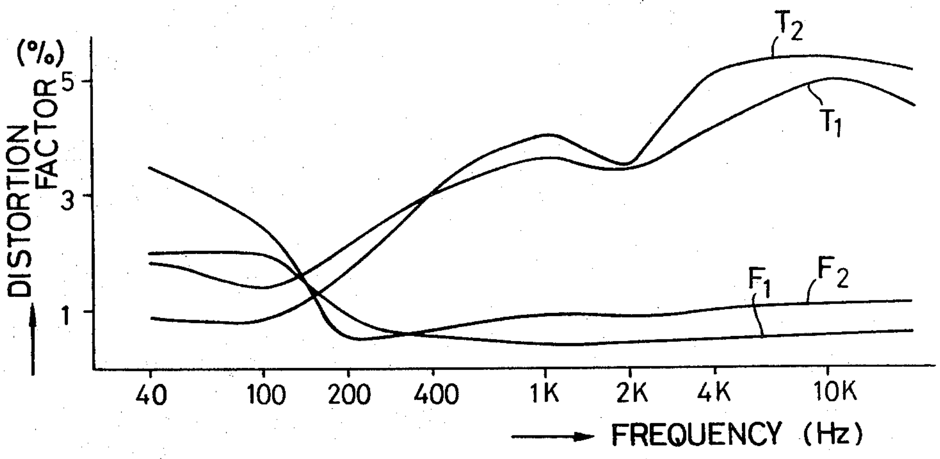
FIG. 12 is a graphical representation indicating the distortion factor characteristics respectively in the case where a FET is used and in the case where a transistor is used as a control element in the circuit shown in FIG. 12.

In the one-loop expanding circuit according to a second embodiment of this invention, the FET Q4 is employed as the control element. Generally, the linearity of the drain-source resistance of the FET is better and wider than the corresponding linearity of the ordinary transistor. Therefore, this circuit has the advantage of reducing distortion. Shown in FIG. 12 are the distortion factor characteristic curves of the circuit shown in FIG. 7, for making a comparison of the two cases where an FET and a transistor are used as the control element. Curves F1 and F2 represent the characteristics for signal levels 0 VU and +5 VU, respectively, when an FET is used, whereas curves T1 and T2 represent the same signal levels as mentioned above when a transistor is used. As will be evident from this graph, the use of an FET as the control element improves the distortion factor by a quantity of the order of one digit place.

Further, this invention is not limited to these embodiments but various variations and modifications may be made without departing from the scope and spirit of the invention.

What we claim is:

1. A single loop expandor circuit for use in a compression and expansion system, said expandor circuit comprising:

an input terminal to which is applied a signal produced in the compression system by compressing the medium frequency range component of a sound signal, said compressing system comprising means responsive to a control signal derived through a control loop in accordance with the level of the medium frequency range component for compressing the medium frequency range, and means for compressing the high frequency range component of the sound signal responsive to another control signal derived through another control loop in accordance with the level of the high frequency range component;

said single loop comprising feedback filter means for filtering and extracting medium and high frequency range signal components from the signal applied to said input terminal;

means for amplifying the signal applied to said input terminal;

control signal forming means for rectifying the signal extracted by said filter means and forming a control signal voltage;

variable gain means responsive to said formed control signal for controlling the gain of said amplifying means to selectively expand the medium and high frequency range signal components included in the signal applied to said input terminal;

an attenuation circuit means responsive to the output signal of said amplifying means for attenuating the high frequency range signal component more than the medium frequency range signal component by a predetermined decibel level; and an output terminal for providing an output signal responsive to said attenuation circuit.

2. An expandor circuit according to claim 1 in which said amplifying means comprises an amplifying transistor connected for amplifying the signal applied to said input terminal, said variable gain means having a semiconductor element connected by way of an impedance element to the emitter circuit of said amplifying transistor and having an internal resistance value varied in accordance with said control signal voltage, said filter means being connected to filter a signal derived from the emitter circuit of said amplifying transistor, and said control signal forming means being connected to rectify and smooth the signal filtered by said filter means thereby to form the control signal voltage.

3. An expandor circuit according to claim 1 in which said amplifying means comprises an amplifying transistor connected for amplifying the signal applied to said input terminal, said variable gain means including a control transistor having a collector connected by way of an impedance element to the emitter of said amplifying transistor and a base to which said control signal voltage is applied whereby the resistance across the collector and emitter thereof is made variable as a function of said control signal voltage, and circuit means for applying the collector voltage of said amplifying transistor to the base of said control transistor, said collector voltage of the amplifying transistor being of opposite phase relative to the collector voltage of said control transistor and functioning to cancel variation of the resistance value of said control transistor with respect to the variation of the collector potential thereof and to reduce the distortion of the control transistor.

4. An expandor circuit according to claim 1 and means whereby said expandor has an overall frequency characteristic wherein the level of the high frequency band component of a signal has a alrger attenuation of approximately from 2 dB to 7 dB as compared to the attenuation of the medium frequency band component.

5. An expandor circuit according to claim 1 and means whereby said expandor has an overall frequency characteristic wherein the gain characteristics of the low and medium frequency bands are substantially flat when the levels of the medium and high frequency band components of the input signal are very low, and means for attenuating only the high frequency band by approximately 2 dB to 7 dB more than said medium frequency band.

6. An expandor circuit according to claim 1 which further comprises a first amplifying transistor means for amplifying signals applied to said input terminal and a second amplifying transistor means for amplifying signals from said first amplifying transistor means, and said filtering means comprises a capacitor connected to the collector of said second amplifying transistor for providing a low-cutoff filter for cutting off only the low frequency band component.

7. An expandor circuit according to claim 1 which further comprises an amplifying transistor means for amplifying the signals applied to said input terminal, said transistor having an emitter, and said variable gain means comprises a control field-effect transistor having a gate, drain, and source connected by way of an impedance element to the emitter of said amplifying transistor, the resistance value measured across said source and drain being varied responsive to an application of said control signal voltage to the gate thereof.

8. An expandor circuit according to claim 7 which further comprises an AC feedback circuit comprising a resistor and a capacitor connected across the source and gate of said field-effect transistor, said capacitor functioning as a filter to improve the operational linearity of said field-effect transistor.

9. An expandor circuit according to claim 1 wherein said variable gain means comprises means responsive to a decrease in the control signal voltage for controlling the gain of said amplifying means to attenuate the medium and high frequency signal components included in the signal applied to said input terminal.

10. An expandor circuit according to claim 1 wherein said predetermined decibel level is between substantially 2 dB and 7 dB.

* * * * *